United States Patent [19]

Fujikawa

[11] Patent Number: 4,754,586
[45] Date of Patent: Jul. 5, 1988

[54] CLIP FOR FIXING VEHICLE WINDOW GLASS

[75] Inventor: Yoshihiro Fujikawa, Toyota, Japan

[73] Assignee: Toyota Jidosha Kabushiki Kaisha, Aichi, Japan

[21] Appl. No.: 17,003

[22] Filed: Feb. 18, 1987

Related U.S. Application Data

[63] Continuation of Ser. No. 751,130, Jul. 2, 1985, abandoned.

[30] Foreign Application Priority Data

Jul. 3, 1984 [JP] Japan ................................ 59-99647

[51] Int. Cl.⁴ ............................................. E06B 3/00
[52] U.S. Cl. ....................................... 52/208; 52/716; 52/717.1; 24/290; 24/291; 24/292
[58] Field of Search ................................. 24/289–293; 52/208, 716, 717.1

[56] References Cited

U.S. PATENT DOCUMENTS

| | | | |
|---|---|---|---|
| 2,677,862 | 5/1954 | Flora | 24/290 |
| 2,716,263 | 8/1955 | Flora et al. | 24/291 |
| 3,137,048 | 6/1964 | Bedford, Jr. | 24/291 |
| 3,357,064 | 12/1967 | Munse | 24/291 |
| 4,170,855 | 10/1979 | Murray et al. | 52/717.1 X |
| 4,197,688 | 4/1980 | Mauer | 24/292 |
| 4,379,379 | 4/1983 | Sengoku | 52/208 |
| 4,412,406 | 11/1983 | Sengoku | 52/208 |
| 4,611,850 | 9/1986 | Fujikawa | 52/717.1 X |

FOREIGN PATENT DOCUMENTS 5631912 8/1954 Japan .
5611621 2/1955 Japan .

Primary Examiner—Kenneth J. Dorner
Assistant Examiner—Laurie K. Cranmer
Attorney, Agent, or Firm—Finnegan, Henderson, Farabow, Garrett and Dunner

[57] ABSTRACT

The present invention relates to a clip made of a resin or similar material, which clip is designed to be secured to an edge of a window portion of a vehicle panel for fixing window glass in said portion and also fitted with a molding. The clip is provided with a protuberance and an engaging portion for properly mounting and fixing window glass and molding. The clip of the present device is especially characterized by a pair of elastic guide protrusions formed at both side ends of said protuberance so as to extend therefrom upwardly of window glass and also so designed that they can be housed in said molding.

4 Claims, 2 Drawing Sheets

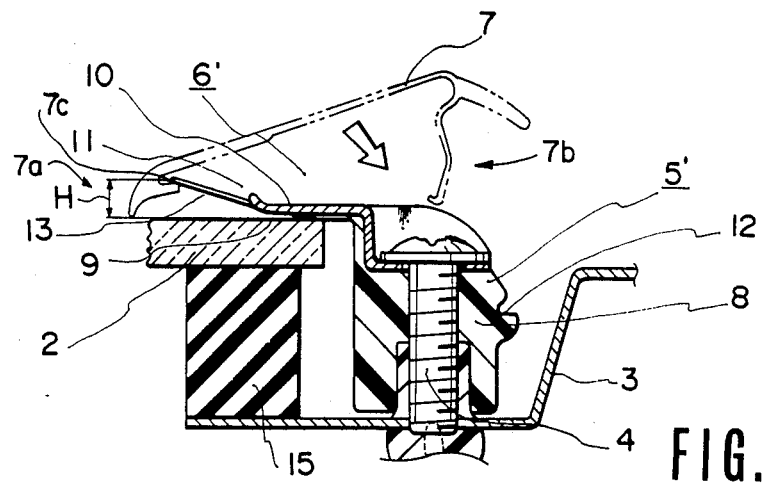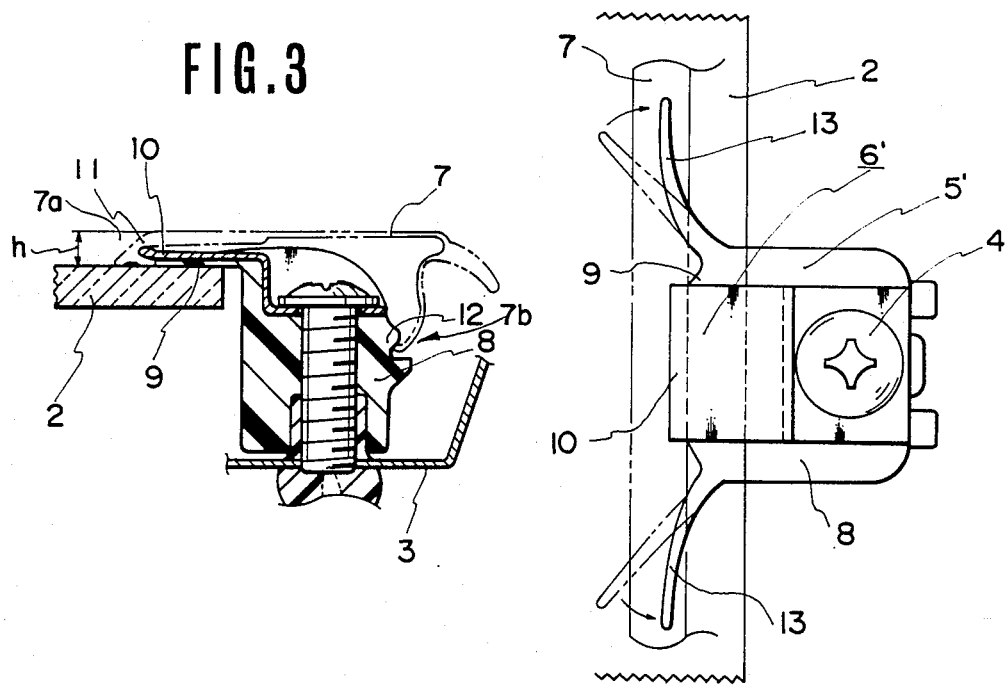

CLIP FOR FIXING VEHICLE WINDOW GLASS

This application is a continuation of application Ser. No. 751,130 filed July 2, 1985 now abandoned.

FIELD OF THE INVENTION

The invention disclosed herein belongs to the field of art of clips used for mounting glass windows or the like of a vehicle on a vehicle body panel.

DESCRIPTION OF THE RELATED ART

Generally, window glass of a vehicle is fixed in position by glass fixing clips secured to a vehicle body panel, and as for instance shown in Japanese Utility Model Application Nos. 116218/1981 and 31912/1981. Such glass fixing clips also function as a means for mounting a molding.

With increasing requirements for better interior accommodation and for better external appearance of automobiles in recent years, there has been a tendency toward neat and simple style and appearance of the whole car body. In line with this tendency, attempts have been made to minimize the rise of molding above the window glass level.

As illustrated in FIGS. 4 and 5, window glass 2 of a vehicle 1 is supported by a protuberance 6 of a vehicle window glass fixing clip 5 secured to a body panel 3 by screw 4, and a molding 7 is adapted to cover the clip 5. In such an arrangement, to meet the above requirements, the height H from the upper surface of window glass 2 to the molding 7 tends to be reduced to a minimal height h shown in FIG. 6.

With the conventional clip, to secure the minimal height h (distance from window glass 2 to molding 7), protuberance 6 of clip 5 must be provided at a position close to window glass 2. Therefore, great skill was required to set molding 7.

If protuberance 6 of clip 5 is positioned far from window glass 2 to facilitate the molding setting, a level difference will be created along the edge of window glass 2 which impairs appearance.

Further, much time is required for the mounting task when conventional clips are used, thereby making this an expensive project.

SUMMARY OF THE INVENTION

The object of the present invention is to provide an excellent vehicle window glass fixing clip which is not only capable of securely fixing window glass in position but can also reduce the level difference between window glass and molding in order to to improve appearance while facilitating mounting, thus eliminating the problems of prior art systems and benefiting the field of utilization of vehicle bodies in the vehicle industries.

Additional objects and advantages of the present invention will be set forth in part in the description that follows and in part will be obvious from the description or may be learned by practice of the invention. The objects and advantages of the invention may be realized and obtained by the methods and apparatus particularly pointed out in the appended claims.

To achieve the objects and in accordance with the purpose of the invention, as embodied and as broadly described herein, a clip for attaching a window to a vehicle body and for fixing a molding strip to cover the clip and the edge of the window is provided. The molding has a lip along a first elongated edge adapted to fit between a protuberance on the clip and the surface of the window and a second opposite elongate edge having means to secure the second edge of the molding strip to the clip. The clip comprises a body member having a protuberance for pressing the window against the vehicle body, the protuberance having an engaging edge for engaging the lip. The body member also has a portion spaced from the protuberance wherein the spaced portion includes a stepped region and means for fastening the body member in operative position to the vehicle. A first elastic protrusion extends outwardly from the protuberance and slants upwardly relative to the window, the protrusion being adapted to engage the lip and to be deformed for guiding the lip between the protuberance and the window and onto the engaging edge of the protuberance in response to the pressing of the engaged molding in a direction for fastening the second edge to the stepped region.

BRIEF DESCRIPTION OF THE DRAWINGS

FIG. 1 is a sectional view showing installation of the invention.

FIG. 2 is a plan view of FIG. 1.

FIG. 3 is a sectional view of the invention after installation has been completed.

DETAILED DESCRIPTION OF THE PREFERRED EMBODIMENT

Figure 4:
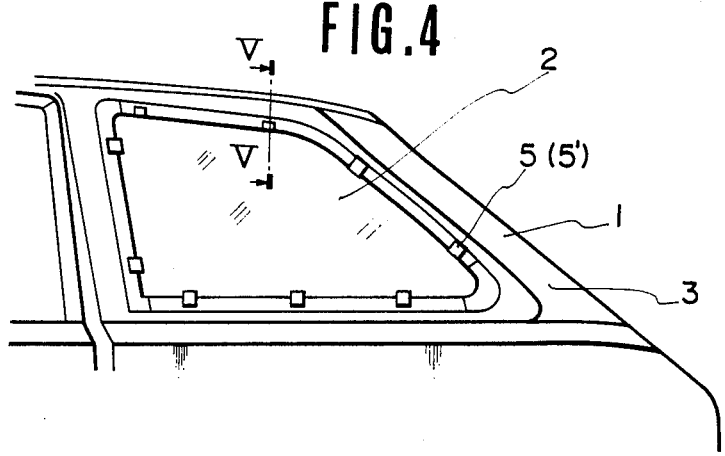
FIG. 4 is a partial side view of the rear of a vehicle.
Figure 5:
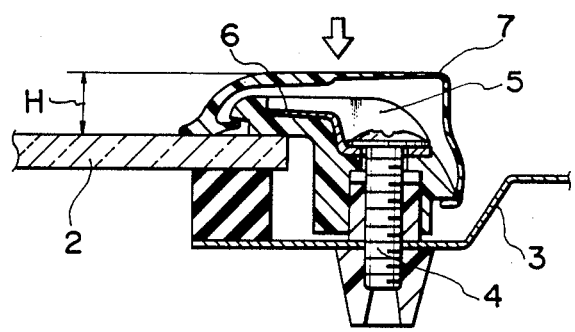
FIGS. 5 and 6 are sectional views showing the conventional system.
Figure 6:
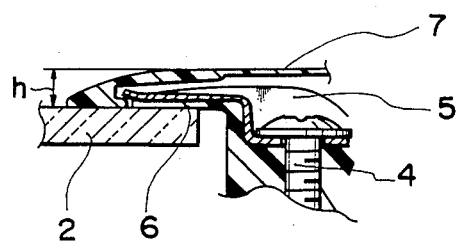

An embodiment of the present invention will be described below based on FIGS. 1, 2 and 3 and with reference to FIG. 4. The accompanying drawings, which are incorporated in and constitute a part of this specification, illustrate a presently preferred embodiment of the invention and, together, with the description, serve to explain the principles of the invention. Throughout the drawings, like reference characters are used to designate like elements.

As illustrated in FIG. 4, each vehicle window glass fixing clip (hereinafter referred to simply as clip) 5' is provided along the edge of window glass 2 of a vehicle, and as illustrated in FIG. 1, the clip body 8, or the body portion of said clip 5', is secured to a vehicle panel 3 by means of screw 4. A protuberance 6' formed at one end of said clip body holds window glass 2.

The protuberance 6' consists of a protuberant portion 9 protruding from and integral with the clip body 8 toward window glass 2, and a crank-like retainer 10 secured to clip body 8 by the screw 4. The end of the retainer 10 is slightly bent upwardly to serve as an engaging portion 11 of the protuberance 6' for engaging and fixing a molding 7 in position in collaboration with a stepped region 12 formed at the other end of the clip body 8.

It will be noted that said clip 5' is so designed that the height h is minimum in the state where the molding 7 has been set in position as shown in FIG. 3.

As illustrated in FIG. 2, the protuberance 6' consisting of said protuberant portion 9 and retainer 10 is further integrally provided with a pair of elastic guide protrusions 13, 13 which project out aslant upwardly of window glass 2 from said protuberance 6' and which are so designed that they can be housed in the molding 7. As shown in FIG. 2, the protrusions 13, 13 are tapered in the direction of their respective free ends so that the protrusions can bend to follow the movement of the molding to the position shown in FIG. 3.

According to this arrangement, the height h or distance from the surface of the window glass 2 to the top of the molding 7 after assembling, as shown in FIG. 3, is small. However, there is provided an ample space H between window glass 2 and guide protrusions 13, 13 to facilitate mounting the molding 7. Sealant 15 is provided between window glass 2 and vehicle panel 3.

EXAMPLE

Action:

In the above-described construction, window glass 2 fitted to panel 3 with the aid of sealant 15 is secured in position by clip 5' fixed to panel 3 with screw 4.

To fit a molding 7 to the engaging portion 11 of retainer 10 of protuberance 6' of the clip body to the stepped portion 12 of the clip body, a molding 7 is first hitched to guide protrusions 13, 13 extending from both sides of said protruberance 6' and is then pulled outwardly as shown by the arrow in FIG. 1. When the molding 7, guided by the guide protrusions 13, 13, is pulled until the guide protrusions 13, 13 are brought into a fully spread-out state, an engagement end 7a of the molding is automatically fitted with the engaging portion 11 of retainer 10. The engagement end 7a includes an interior groove 7c for receiving the guide protrusions 13, 13 and the engaging end portion 11.

The molding 7 is then pressed down in the direction of the arrow in FIG. 1 until another engagement end 7b of the molding 7 engages the stepped region 12 of clip body 8, thus complete the mounting of molding 7 which is securely held in position by the elasticity of guide protrusions 13, 13.

This mounting operation is facilitated by an ample space H between window glass 2 and guide protrusions 13, 13. Thus, by a simple operation, merely pulling and pressing down, molding 7 can be smoothly set in position without requiring any high skill even though the height h from window glass 2 to molding 7 is small as shown in FIG. 3.

The modes of practice of the present device are of course not limited to the above-shown embodiments, and it is possible to employ various other froms of embodiment. For instance, the protuberance may be molded integral with the clip body. The invention in its broader aspects, therefore, not limited to the specific details, representative apparatus, and examples shown and described hereinabove. Thus, it is intended that all matter contained in the foregoing description or shown in the accompanying drawings shall be interpreted as illustrative and not in a limiting sense.

According to the present invention, there are provided the following prominent effects: the difficulty in mounting a molding due to the reduced height from window glass surface to molding surface is eliminated; both external appearance and workability are improved; and skill is not required for the installation. Also, owing to the provision of elastic guide protrusions extending from both sides of the protuberance upwardly of window glass and designed to be housed in said molding, the molding can be securely set in position in an elastic way, increasing the reliability of the device.

Further, since installation can be accomplished in a short time without requiring skill, a cost reduction can be realized.

What is claimed is:

1. A vehicle window assembly, comprising:
   a body panel;
   a window glass extended along said body panel and having an outer surface;
   sealing means disposed between said window glass and said body panel;
   clip means engaged along said outer surface attaching said window glass to said body panel, said clip means including:
   a clip body disposed along said body panel proximate a peripheral edge of said window glass, said clip body having a stepped region facing away from said peripheral edge;
   a protuberant portion projecting substantially orthogonally from said clip body and engaging said outer surface;
   a pair of resilient guide protrusions integrally formed with said clip body, said pair of guide protrusions being spaced along said protuberant portion and projecting from said protuberant portion at divergent angles, said guide protrusions normally sloped in direction away from said window glass, each of said pair of guide protrusions having a distal end normally displaced a predetermined distance from said outer surface; and
   attachment means for securing said clip body to said body panel;
   a retainer secured to said clip body and mounted along said protuberant portion, said retainer being aligned substantially between said pair of guide protrusions and including an engagement end portion bent away from said window glass; and
   molding means tightly fitted over said retainer, said molding means including a molding strip having first and second engagement means at opposite ends thereof, said first engagement means being attached to said clip body along said stepped region, said second engagement means including an interior groove, said distal ends of each of said pair of guide protrusions being deformed to guide said distal ends and said engagement end portion within said interior groove, so that said molding strip is held along said outer surface.

2. The vehicle window assembly defined in claim 1, wherein said pair of guide protrusions are tapered along said distal ends.

3. The vehicle window assembly defined in claim 1, wherein said divergent angles of said pair of guide protrusion are aligned symmetrically about said protuberant portion.

4. An assembly for attaching a window to a vehicle body, comprising:
   a clip including a protuberence having a substantially planar window engaging surface at a first end of said clip and attachment means disposed along a second end of said clip to secure said clip to the vehicle body, said clip also including a stepped region;
   a retainer secured to said clip body and extending along said protuberance, said retainer having an engagement end portion bent at an acute angle to the plane of said window engaging surface;
   a pair of resilient guide protrusions integrally formed with said clip, said pair of guide protrusions being spaced along said protuberance and projecting from said protuberance at divergent angles, said guide protrusions normally sloped in a direction away from said window engaging surface, each of said pair of guide protrusions having a distal end normally displaced a predetermined distance from the plane of said window engaging surface; and molding means tightly fitted over said retainer, said molding means including a molding strip having first and second engagement means at opposite ends thereof, said first engagement means being attached to said clip along said stepped region, said second engagement means including an interior groove, said distal ends of each of said pair of guide protrusions being deformed to guide said distal ends and said engagement end portion within said interior groove, so that said molding strip is held along the plane of said window engaging surface.

* * * * *